United States Patent
Liu et al.

(10) Patent No.: US 7,976,820 B2
(45) Date of Patent: Jul. 12, 2011

(54) COMPOSITION AND METHOD FOR IMPROVED ALUMINUM HYDROXIDE PRODUCTION

(75) Inventors: Jianjun Liu, Aurora, IL (US); James A Counter, Thirroul (AU); Dmitri L Kouznetsov, Aurora, IL (US); David H Slinkman, Lombard, IL (US)

(73) Assignee: Nalco Company, Naperville, IL (US)

( * ) Notice: Subject to any disclaimer, the term of this patent is extended or adjusted under 35 U.S.C. 154(b) by 1033 days.

(21) Appl. No.: 11/434,490

(22) Filed: May 15, 2006

(65) Prior Publication Data

US 2007/0081932 A1 Apr. 12, 2007

Related U.S. Application Data

(63) Continuation-in-part of application No. 11/159,467, filed on Jun. 23, 2005.

(51) Int. Cl.
*C01F 7/34* (2006.01)
(52) U.S. Cl. .................... 423/629; 423/111; 423/127
(58) Field of Classification Search .................. 423/629, 423/111, 119, 120, 121, 122, 127
See application file for complete search history.

(56) References Cited

U.S. PATENT DOCUMENTS

| | | | |
|---|---|---|---|
| 4,608,237 | A | 8/1986 | Roe et al. |
| 4,737,352 | A | 4/1988 | Owen et al. |
| 5,106,599 | A | 4/1992 | Roe |
| 5,312,603 | A | 5/1994 | Hachgenei et al. |
| 5,607,598 | A | 3/1997 | Williams |
| 6,168,767 | B1 | 1/2001 | Welton et al. |
| 6,217,622 | B1 | 4/2001 | Hiscox |
| 6,293,973 | B1 | 9/2001 | Farquharson et al. |
| 6,599,489 | B2 | 7/2003 | Mahoney et al. |
| 2006/0273040 | A1 | 12/2006 | Quadir et al. |

*Primary Examiner* — Stanley Silverman
*Assistant Examiner* — James A Fiorito
(74) *Attorney, Agent, or Firm* — Joshua D. Bishop; Michael B. Martin (57) ABSTRACT

An improved method and composition for producing aluminum hydroxide crystals in a Bayer process pregnant liquor, involve the addition of an emulsified crystallization modifier comprising a $C_8$-$C_{10}$ fatty acid, precursors, salts or blends thereof. The alkyl chain of the fatty acid crystallization modifier is free of functional groups. The modifier yields a commercially viable product in the presence and absence of a hydrocarbon oil which dissolves the fatty acid. Further, the modifier, prepared in either an emulsified form or as a fatty acid neat, facilitates formation of oxalate aggregates greater than 200 μm which may be readily screened out with minimum trihydrate loss.

43 Claims, 3 Drawing Sheets

COMPOSITION AND METHOD FOR IMPROVED ALUMINUM HYDROXIDE PRODUCTION

RELATED APPLICATIONS

This application is a continuation-in-part of U.S. application Ser. No. 11/159,467, filed Jun. 23, 2005, from which filing priority is hereby claimed and the disclosure of which is hereby incorporated by reference.

FIELD OF THE INVENTION

The present invention relates to improved aluminum hydroxide crystal production from the Bayer Process. In particular, the invention relates to compositions and methods for increasing particle size of aluminum hydroxide crystals without an excessive decreased yield.

BACKGROUND OF THE INVENTION

Aluminum hydroxide (also known as alumina trihydrate) is used to produce primary aluminum metal using electrolytic reduction processes. Aluminum hydroxide is produced on an industrial scale by a well-established procedure known as the Bayer Process. In this process, the steps involving crystallization and precipitation of solubilized aluminum hydroxide values from process liquors, are critical relative to the economic recovery of aluminum values. Economic recovery is realized by optimization of two commercially significant parameters: yield and average particle size.

Efforts to increase the yield and particle size of the aluminum hydroxide recovered from Bayer process liquor have failed to provide optimization of a commercially significant product. With the steep rise in energy costs during the past few years, aluminum hydroxide processing operators continue to seek optimal parameters for producing a commercially-acceptable aluminum hydroxide product. Despite efforts to identify chemical additives and methods to reduce the number of undersized alumina particles while maintaining process efficiency, none have been entirely successful in increasing yield and particle size of the alumina recovered in Bayer process liquors. The products of these efforts include filter aids such as coagulants or flocculants optionally containing polyacrylic acids (PAA), crystallization modifiers, and dewatering agents. For example, U.S. Pat. No. 4,737,352 (hereinafter the '352 patent) assigned to Nalco discloses a method providing a reduced percent of small size crystals and an increase in the yield of coarser aluminum hydroxide crystals by adding a blend of surfactant dispersed in oil to the pregnant liquor during the precipitation phase of the process.

The claims in the patent limited the surfactant to a tall fatty acid. The specification of the '352 patent, however, disclosed the surfactant as any fatty acid having at least a saturated or unsaturated four carbon alkyl backbone optionally containing at least one functional group. Additionally, the specification discloses a functionalized $C_8$ alkyl fatty acid as advantageous; the fatty acid was not claimed and the advantages of this fatty acid is not disclosed or taught by actual or constructive reduction to practice. The specification defines the improved method as treating hot caustic Bayer process green liquor with a surfactant/oil blend. The specification does not teach, describe, or remotely suggest that the length of the carbon chain of the fatty acid is a factor imparting novelty. Two commercial crystal growth modifiers having fatty acid chains of greater than ten carbons were commercialized and are referred to as Commercial Product 1 and Commercial Product 2 in examples exemplifying the inventive step of teaching fatty acid chain length in improved aluminum hydroxide production. The '352 patent discloses a genus of fatty acids in oil that result in an improved commercial product. The fatty acid composition described herein is directed to a fatty acid species imparting unexpected results from those described in the genus patent.

The limitations of yield and particle size of alumina recovered from Bayer process liquors are also disclosed in U.S. Pat. No. 6,168,767 (hereinafter the '767 patent) entitled "Production of Alumina" assigned to Ciba Specialty Chemicals Water Treatments Limited. A water-soluble crystallization modifier formulation is disclosed comprising a first composition of a polyalkoxylated non-ionic surfactant and a second composition comprising a surfactant, or a precursor thereof, which is not polyalkoxylated. Ethylene oxide (EO) units are identified as essential components of the formulation in the polyalkoxylated non-ionic surfactant, preferably, ethylene oxide and propylene oxide (PO) units which form an ethylene oxide-propylene oxide block copolymer. The '767 patent discloses a composition which contains "substantially no mineral oil or silicone oil" and emphasizes regularly that the "advantage of the crystallization modifiers . . . is that they do not require the presence of oils." (e.g., see column 2, lines 21-25; col. 4, lines 25-35; col. 5, lines 21-33). The cost effectiveness of these components and their acceptance when compared to the surfactant/oil blends used in the majority of crystallization modifier formulations in most Bayer processing plants today remains questionable.

Also affecting the particle size and product yield parameters in alumina recovery is the presence of oxalate in the pregnant liquor. Oxalate is a contaminate that can act as a seed site resulting in too many small hydroxide crystals, thereby lowering average particle size. Further, screening processes intended to remove oxalate impurities also remove alumina, thereby reducing product yield. These phenomena must be considered in any recovery process.

Despite efforts to satisfy the demands made by continuous and ongoing development of the Bayer process worldwide, the industry needs for an improved alumina product remain unfulfilled.

SUMMARY OF THE INVENTION

To satisfy the long-felt but unsolved needs identified above, a method and composition for obtaining aluminum hydroxide crystals with increased particle size and yield in the Bayer process have been developed. This result is realized by the addition of emulsified $C_8$-$C_{10}$ fatty acids, precursors, salts or blends thereof, said fatty acid carbon backbone free of functional groups. Depending on the parameters of the processing system, the $C_8$-$C_{10}$ crystallization modifier is dissolved in an oil carrier before being emulsified in water.

Thus a composition described and taught herein includes as an active ingredient a surfactant fatty acid, precursor, salt or blends thereof having an alkyl chain length of $C_8$ to $C_{10}$ saturated or unsaturated, branched or unbranched carbon atoms, said carbon atoms free of functional groups dissolved in an oil carrier having the boiling point above the temperature prevailing alumina hydrate crystallization. This fatty acid/oil blend is emulsified and then dosed in the Bayer process liquor according to the method described herein.

A second composition described and taught includes as an active ingredient a surfactant fatty acid, precursor, salt or blends thereof having an alkyl chain length of $C_8$ to $C_{10}$ saturated or unsaturated, branched or unbranched carbon atoms, said carbon atoms free of functional groups. This fatty acid is emulsified and dosed into the liquor according to the method described herein.

The appropriate crystallization modifier composition is incorporated into the method in an amount effective to shift in the particle size distribution of aluminum hydroxide crystals so that the resulting crystals have a reduced formation of product fines without substantial reduction in the overall product yield of aluminum hydroxide.

DETAILED DESCRIPTION OF THE INVENTION

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

The following are definitions which apply to the relevant terms as used throughout this specification.

About: This term is used to modify a numeric value and should be interpreted as a value which is equal to or within 2 integers of the specified number.

Commercial Product 1 and Commercial Product 2: Describes commercialized crystal growth modifiers (CGM) having fatty acid chains of greater than ten carbons as identified and used in the examples of the '352 patent referenced above.

Crystallization modifier composition: The list, description and designated proportions of raw materials used to make the said additive comprising a C8-10 fatty acid.

Fatty acid having an alkyl chain length of $C_8$-$C_{10}$ carbon atoms: Describes the product C-810L available from Proctor and Gamble. It is a nearly colorless, clear liquid with a slight yellow tint. It has an average molecular weight of 154 g/mol and an approximate composition of the following fatty acid chain lengths: $C_6$<6%, $C_8$ 53-60%, $C_{10}$ 34-42% and $C_{12}$<2%. The carbon chain may be saturated or unsaturated, branched or unbranched and is free of functional groups. Many other commercial fatty acid products are known to those skilled in the art and would work suitably for the present invention.

Oil carrier: Comprises a hydrophobic liquid that can be selected from the aliphatic or aromatic compounds such as paraffinic oils, naphthenic oils, or fuel oils. Suitable is also the oil carrier comprised of the bottoms or residual waste materials remaining from the production of alkyl alcohols. Such materials are generally comprised of a mixture of hydroformylation reactants (olefins), finished products (alcohols), and the ethers and ester by-products. The materials suitable as an oil carrier can be used neat or in a mixture of any proportion.

Heavy oxo fraction (HOF: Is a useful solvent for the present invention. HOF is primarily comprised of residual waste materials remaining from the production of alkyl alcohols. High boiling alkyl alcohol bottom products are included in this category and contain a mixture of hydroformylation reactants (olefins), finished products (alcohols), as well as ethers and ester by-products.

Weight percent ratio: The total weight fraction of one reagent within 100 grams of the composition or mixture. The corresponding fraction of the other component is the latter subtracted from 100.

Free of functional group attachments: Any alkyl chain of any length with hydrogen and carbon being the only atoms comprising that chain.

Heated Bayer process liquor: Any liquor within the Bayer process having a free alkalinity level above 100 g/L of $Na_2CO_3$ and a temperature above ambient or 25° C.

Spent Liquor: Describes the Bayer liquor after the final classification stage which returns back to digestion in the Bayer process.

Percent (%) increase over control quantile particle size: The particle size distribution is conventionally given by the three quantiles, d(0.1), d(0.5) and d(0.9). Thus, 10%, 50% and 90%, respectively, of the total particle volume (or mass) is less than the size given in the tables. The percent (%) increase over the control quantile particle size is the difference between the additive dosed and control for the respective quantile particle size divided by the control quantile particle size.

Effective amount: An effective amount is deemed any dosage of any additive that affords an increase in one or all three quantiles when compared to an undosed control sample.

Increased product yield: Describes when a greater aluminum hydroxide solid content within the precipitating vessel at the end of the precipitation run is achieved. This is generally indicated by a lower liquor aluminum hydroxide concentration for the corresponding vessel.

The Processing Liquor

The examples employ a pregnant liquor (charge) for aluminum hydroxide precipitation, which is the hot caustic solution obtained after elimination of the red mud in the Bayer process. An understanding of the entire Bayer Process is unnecessary to understanding the inventive concept: a $C_8$-$C_{10}$ fatty acid in the presence or absence of oil carrier, emulsified in water. The green liquor, after red mud separation, is a hot, caustic filtrate, the commercial production green liquor containing the aluminum values as dissolved sodium aluminate. This liquor and recirculated fine particle alumina trihydrate seeds are charged into a suitable precipitating tank or a series of connecting tanks. Here, the charge is cooled under agitation to stress the contents, causing precipitation of aluminum hydroxide crystals on the seeds, which constitute growth sites.

Complete elimination of the fine particle material (e.g. −325 mesh or smaller) is not wanted. There needs to be a remnant source of seeds, following precipitation, for recirculation to serve the next generation of repeated growth in a continuous process.

In brief, the precipitation process involves nucleation followed by (a) initial crystal growth and (b) agglomeration of those crystals into a coarse or sand-like aluminum hydroxide particle which will later be dried, and often calcined to obtain $Al_2O_3$ as the commercial product of value.

The Fatty Acid/Oil Carrier Characterization

An exemplified $C_8$-$C_{10}$ fatty acid is the product C-810L available from Proctor and Gamble at a concentration of 150 g/L dispersed in a commercially available paraffinic hydrocarbon oil, ESCAID 110. As described in U.S. Pat. No. 4,737, 352 assigned to Nalco, wherein generic tall oil fatty acid/oil formulations were first described, the invention in practice is unaffected by different proprietary precipitation techniques involving proprietary process parameters. This is of great significance because it establishes that regardless of the proprietary processing parameters maintained inside the precipitating tank, the present invention for actual practice only requires blending and in-line injection of an emulsion which composes the treatment. The constituents of the emulsion are (A) a $C_8$-$C_{10}$ fatty acid together with (B) an oil carrier for the fatty acid, and (C) as much as 85% water, by weight. The oil need only be a solvent for the surfactant and have a boiling point safely above the temperature of the hot Bayer green liquor undergoing precipitation. Advantageously, the fatty acid may contain at least an eight carbon backbone free of any functional groups usually modifying such compounds.

Since the $C_8$-$C_{10}$ are oil soluble, the only limitation on which oil to choose is one with a boiling point above about 200° F. The oil carrier may be one selected from the paraffinic series, it may be an aromatic oil (e.g. naphthenic oil) or it may be any mixture of these. For example, an emulsion of $C_8$-$C_{10}$ unmodified fatty acid in a low aromatic or paraffinic oil as the oil carrier, in the weight proportion of about 15:85, emulsified in water and having a dosage of from about 1 to about 50 ppm.

The test performed examples below demonstrate the improved commercial product obtained by employing the methods and compositions taught and described. The standard pretreatments, comparative pretreatments and testing used in the assessment of the efficacy of the C8-10 fatty acid are as follows:

Precipitation Tests: Additive Evaluation

All precipitation tests were performed in 250-mL Nalgene® bottles rotated end-over-end, at 10 rpm, in an Intronics temperature-controlled water bath. The pregnant liquor having a density of 1.30 kg/L (~72° C.) was placed into the bottles by weight (200 mL=260.0 g), for improved precision. The additive was dosed, with respect to the total surface area of the seed crystals (mg/m$^2$), to the lid of the appropriate bottles using a micro-syringe and the bottles were then placed in the rotating bath for equilibration at 72° C. (20 minutes). After equilibration, the bottles were removed, quickly charged with the required quantity of seed (50 g/L, based on liquor volume) and immediately returned to the water bath. The temperature of the water bath was set to 72° C. The bottles were rotated overnight for 15 hours.

On completion of the 15 hours, the bottles were removed and for each bottle a 20-mL sample of the slurry was filtered through a syringe filter and submitted for liquor analysis. To prevent any further precipitation, 10 mL of a sodium gluconate solution (400 g/L) was added to the remaining slurry and mixed well. The solids were collected by vacuum filtration and were thoroughly washed with hot deionized water and dried at 110° C. The particle size distribution and specific surface area were determined on a Malvern Particle Sizer, which is well known in the art. The particle size distribution is conventionally given by three quantiles, d(0.1), d(0.5) and d(0.9). These represent the particle size at which the total particle volume (or mass) is less than about 10%, 50% and 90% respectively.

Samples were evaluated first (TABLE 1) by comparing (1) an undosed control sample; (2) samples dosed with a hydrocarbon solution CGM as Comparative Example 1; and (3) samples dosed with the water-based C8-10/oil carrier blend of Example 2. Samples were then evaluated (TABLE 2) by comparing (1) an undosed control sample; (2) a Commercial Product CGM; and (3) samples dosed with the water-based C8-10/oil blend of Examples 3-5.

C8-10 Fatty Acid CGM Formulations Prepared as Emulsions

The results below compare the CGM products of the present invention prepared as hydrocarbon solutions and water emulsions.

The suitable CGM products can be prepared as water-in-oil or oil-in-water emulsions. However, CGM formulations prepared as microemulsions are preferred.

Microemulsions are significantly different in structure from regular emulsions. Emulsions are comprised of separate oil droplets in water or water droplets in oil with a sharp transition between the two phases. Microemulsions have a particle size in the range from 10 to 600 nm, so that they appear as clear or opalescent one-phase formulations.

Unlike regular emulsions, microemulsions are thermodynamically stable. This means that microemulsions form spontaneously when the components are brought together and stay stable as long as the components are intact. Thus, their manufacturing may be reduced to simple kneading without the need for expensive high energy mixing. Also, microemulsions are not prone to separation or settling, which results in their long storage stability. Only gentle mixing is required to restore microemulsions upon their freezing or high temperature exposure. The examples and results are provided below.

Comparative Example 1 (Hydrocarbon Solution)

15% C8-10 fatty acid blend available from Proctor and Gamble Chemicals under the tradename C-810L, and 85% paraffinic oil (dearomatized aliphatic fluid) available from Exxon Mobil Corporation under the tradename Escaid 110.

Example 2 (Emulsion)

15% C8-10 fatty acid blend available from Proctor and Gamble Chemicals under the tradename C-810L, 30% paraffinic oil (dearomatized aliphatic fluid) available from Exxon Mobil Corporation under the tradename Escaid 110, 5% ethoxylated C110-16 alcohol emulsifier, and 45% water.

Example 3 (Emulsion)

15% C8-10 fatty acid blend available from Proctor and Gamble Chemicals under the tradename C-810L, 30% C10 alcohol distillation residue available from Nalco Company under the tradename NALCO 99DA115, 15% ethoxylated propoxylated C14-C18 alcohol emulsifier available from Nalco Company under the tradename NALCO 60096, 20% pH adjuster (50% potassium hydroxide) available from Nalco (R-192), and 20% water.

Example 4 (Emulsion)

15% C8-10 fatty acid blend available from Proctor and Gamble Chemicals under the tradename C-810L, 20% C10 alcohol distillation residue available from Nalco Company under the tradename NALCO 99DA115, 25% ethoxylated propoxylated C14-C18 alcohol emulsifier available from Nalco Company under the tradename NALCO 60096, 18% pH adjuster (50% potassium hydroxide) available from Nalco (R-192), and 22% water.

Example 5 (Emulsion)

15% C8-10 fatty acid blend available from Proctor and Gamble Chemicals under the tradename C-810L, 45% ethoxylated propoxylated C14-C18 alcohol emulsifier available from Nalco Company under the tradename NALCO 60096, 10% pH adjuster (50% potassium hydroxide) available from Nalco (R-192), and 30% water.

As shown in Table 1, the emulsion Example 2 has a coarsening effect similar to that of the hydrocarbon Example 1.

TABLE 1

Effect of C8-10 Fatty Acid Products on Particle Size of Bayer Aluminum Hydroxide at 72° C. Comparison of Hydrocarbon Solutions and Water Emulsions.

| Example | Dose (mg/m$^2$) | Quantile Particle Size, μm | | | % Increase in Mean of Control Quantile Particle Size | | |
|---|---|---|---|---|---|---|---|
| | | d(0.1) | d(0.5) | d(0.9) | d(0.1) | d(0.5) | d(0.9) |
| Control 1 | — | 43 | 70 | 111 | | | |
| Control 2 | — | 44 | 70 | 112 | | | |
| Average | — | 43 | 70 | 112 | | | |
| Comp. Example 1 | 3 | 47 | 75 | 119 | | | |
| Comp. Example 1 | 3 | 48 | 76 | 120 | | | |
| Average | 3 | 47 | 76 | 120 | 8 | 8 | 7 |
| Example 2 | 3 | 46 | 75 | 119 | | | |
| Example 2 | 3 | 47 | 75 | 120 | | | |
| Average | 3 | 47 | 75 | 120 | 8 | 7 | 7 |

The results show that the C8-10 emulsion product is as effective a CGM as the C8-10 hydrocarbon solution product at a dosage of 3 mg/m$^2$, with increasing particle size at all three quantiles.

Table 2 below shows that the emulsion Examples 3 and 4 have a coarsening effect on particle size similar to that of an existing Commercial Product at various dosages.

The results show that the C8-10 emulsion of Example 3 was as effective at the three dosages in increasing particle size as the Commercial Product. Examples 4 and 5 were more effective than the Commercial Product in increasing particle size at all three dosage levels for each quantile.

The next tests were conducted to support the contention that among a series of linear fatty acids, the optimal CGM performance is achieved in the $C_8$-$C_{10}$ range of chain lengths.

Precipitation Tests: Effect of Chain Length of Fatty Acids

Fatty acids of >98~99% purity including butanoic (C4), hexanoic (C6), octanoic (C8), decanoic (C10), tetradecanoic (C14) and octadecanonic (C18) were purchased from Aldrich (www.aldrich.com). The Escaid 110 aliphatic solvent was used as the oil carrier. Alumina trihydrate C31 (from Alcoa, BET specific surface area of 0.38 m$^2$/g) was used as seed for precipitation. Spent liquor from a North American alumina facility and Alcoa C31 were used for the preparation of the pregnant liquor. Sodium gluconate (97% pure) was used for stopping the further crystal growth upon the bottle test completion.

TABLE 2

Effect of C8-10 Fatty Acid Emulsion Products on Particle Size of Bayer Aluminum Hydroxide at 72° C. at Different Dosing Levels. Results Compared to Existing Commercial Product.

| Example | Dose (mg/m$^2$) | Quantile Particle Size, μm | | | % Increase Over Control Quantile Particle Size | | |
|---|---|---|---|---|---|---|---|
| | | d(0.1) | d(0.5) | d(0.9) | d(0.1) | D(0.5) | d(0.9) |
| Control 1 | — | 40.8 | 65.3 | 103.9 | | | |
| Control 2 | — | 41.3 | 66.2 | 105.1 | | | |
| Average | | 41.1 | 65.8 | 104.5 | | | |
| Commercial Product | 1 | 42.8 | 68.6 | 108.0 | 4 | 4 | 3 |
| Commercial Product | 3 | 44.2 | 70.2 | 111.0 | 8 | 7 | 6 |
| Commercial Product | 5 | 45.3 | 71.8 | 113.3 | 10 | 9 | 8 |
| Example 3 | 1 | 42.9 | 68.4 | 108.6 | 4 | 4 | 3 |
| Example 3 | 3 | 44.2 | 70.1 | 110.7 | 8 | 7 | 6 |
| Example 3 | 5 | 45.1 | 71.9 | 113.3 | 10 | 9 | 8 |
| Example 4 | 1 | 43.1 | 68.6 | 109.2 | 5 | 5 | 4 |
| Example 4 | 3 | 44.9 | 71.4 | 111.5 | 9 | 8 | 7 |
| Example 4 | 5 | 45.9 | 72.5 | 114.4 | 12 | 10 | 9 |
| Example 5 | 1 | 43.2 | 68.8 | 108.6 | 5 | 5 | 4 |
| Example 5 | 3 | 45.4 | 72.0 | 112.7 | 10 | 9 | 8 |
| Example 5 | 5 | 46.4 | 75.6 | 116.0 | 13 | 12 | 11 |

The following test parameters were used to simulate the common precipitation conditions in the Bayer process.

Pregnant liquor: A/C=0.66~0.70
Precipitation temperature: 72° C.
Precipitation time: 15 h
Seed charge: C31=50 g/L
CGM dosage: 3 mg CGM/m² seed surface (60 ppm in the pregnant liquor)

The procedure for preparing the Nalgene® bottle samples is identical to that previously discussed, so it will not be repeated here. The results are reported in TABLE 3 below.

The C4, C6, C8, C10, C14, and C18 fatty acids were prepared each as 15:85 solutions in R-4277 (Escaid 110) hydrocarbon oil and used in the CGM bottle test to determine their coarsening performance.

The results shown in Table 3 indicate that the acid chain length has a significant impact on the crystal coarsening but only a marginal impact on the yield. With increasing carbon chain length in the fatty acids, the particle size of precipitates increases sharply for C8 and C10 fatty acids and then gradually decreases. This is in-line with the claims of the new patent application. This performance is more clear in the lower particle size range (d0.1). The d(0.1) is closely related to the volume percentage of the particles sized in the range from 0 to 45 μm, (−45 μm fraction), which is the characteristic commonly used in the industry. This is especially critical in the high seed charge refineries that operate their process on the number of the fine particles within the system.

Finally, the C8-10 fatty acids were tested for their ability to facilitate formation of oxalate balls in the Bayer liquor. Example 6 was prepared comprising 15% C-810 and 85% HOF and studied against Comparative Example 1, of TABLE 1. Both coarse seed crystals and fine seed crystals were tested with liquor from a North American alumina facility.

The formation of oxalate balls in the Bayer liquor was very sensitive to the composition of Bayer liquor including organics and inorganics, process additives, precipitation conditions, etc. Therefore, the conditions for the oxalate ball formation were unpredictable, as often encountered in both research labs and commercial operations. To identify the conditions for oxalate ball formation, some diagnostic tests (CGM type, seed type, oxalate spike) were first carried out. From the results shown in TABLE 5, it can be concluded that:

a. No visible oxalate balls were formed under all the test conditions;

b. Oxalate precipitation occurs only if oxalate was spiked (to enhance the driving force). About 2 g/l of oxalate were precipitated out when the plant liquor was spiked with 1 g/l oxalate;

c. From the amount of oxalate precipitated, $\Delta[NaOX]_{initial-sp}$, C8-10 fatty acids can slightly stabilize oxalate (~0.2 g/l), compared with Comparative Example 1; and d. There is no noticeable difference in oxalate precipitation among the three types of seeds, coarse seeds, fine seeds and C31 (see TABLE 4).

TABLE 3

Effect of the Fatty Acid Chain Length on the Precipitate Granulometry and Yield, Relative to Blank.

| Chain | Dose (mg/m²) | Quantile Particle Size, μm | | | % Increase Over Control Quantile Particle Size | | |
|---|---|---|---|---|---|---|---|
| | | d(0.1) | d(0.5) | d(0.9) | d(0.1) | d(0.5) | d(0.9) |
| Control 1 | — | 42.7 | 69.3 | 111.1 | | | |
| Control 2 | — | 42.9 | 69.5 | 111.3 | | | |
| Average | | 42.8 | 69.4 | 111.2 | | | |
| Butanoic (C4) | 3 | 43.1 | 69.6 | 111.0 | | | |
| Butanoic (C4) | 3 | 43.0 | 69.5 | 111.2 | | | |
| Average | | 43.0 | 69.5 | 111.1 | 0.5 | 0.1 | 0 |
| Hexanoic (C6) | 3 | 43.2 | 69.9 | 112.0 | | | |
| Hexanoic (C6) | 3 | 43.3 | 70.0 | 112.1 | | | |
| Average | | 43.2 | 70.0 | 112.1 | 0.9 | 0.9 | 0 |
| Caprylic (C8) | 3 | 44.3 | 71.7 | 114.6 | | | |
| Caprylic (C8) | 3 | 44.8 | 72.4 | 115.7 | | | |
| Average | | 44.5 | 72.0 | 115.2 | 4.0 | 3.8 | 3.6 |
| Decanoic (C10) | 3 | 44.3 | 74.9 | 124.8 | | | |
| Decanoic (C10) | 3 | 44.9 | 74.1 | 123.3 | | | |
| Average | | 44.6 | 74.5 | 124.1 | 4.2 | 7.2 | 11.6 |
| Myristic (C14) | 3 | 43.4 | 73.4 | 122.0 | | | |
| Myristic (C14) | 3 | 43.5 | 73.6 | 122.6 | | | |
| Average | | 43.5 | 73.5 | 122.3 | 1.6 | 5.9 | 9.9 |
| Octadecanoic (C18) | 3 | 42.6 | 71.8 | 119.1 | | | |
| Octadecanoic (C18) | 3 | 42.7 | 72.1 | 120.2 | | | |
| Average | | 42.6 | 72.0 | 119.7 | −0.5 | 3.7 | 7.6 |

TABLE 4

Size parameters of seed samples used for tests.

| Seeds | D(0.1), μm | D(0.5), μm | D(0.9), μm | B.E.T. specific area, m²/g |
|---|---|---|---|---|
| C31 | 4.2 | 33.5 | 79.0 | 0.038 |
| Coarse | 50.3 | 89.0 | 149.8 | 0.0867 |
| Fine | 27.06 | 65.15 | 121.7 | 0.157 |

TABLE 5

Oxalate precipitations. Liquor to Precipitation: A 161 g/L, C 227.6 g/L, S 277.7 g/L, A/C 0.711, NaOx 3.2 g/L. (Example 6 vs. Comparative Example 1)

| | Precipitation Conditions | | | Spent Liquor (SP) | | Δ[NaOx]* |
|---|---|---|---|---|---|---|
| Seed | CGM | | [NaOx] | Oxalate balls | [NaOx], | (Initial- |
| g/L | Mg/m² | ppm | Spiked, g/L | Visible | g/L | SP), g/L |
| C31 = 50 | Ex. 6 = 3.0 | 60 | 0 | N | 3.2 | 0 |
| Coarse = 150 | Ex. 6 = 4.6 | 60 | 0 | N | 3.2 | 0 |
| Fine = 100 | Ex. 6 = 3.8 | 60 | 0 | N | 3.3 | −0.1 |
| C31 = 50 | Ex. 6 = 3.0 | 60 | 1 | N | 2.2 | 2 |
| Coarse = 150 | Ex. 6 = 4.6 | 60 | 1 | N | 2.3 | 1.9 |
| Fine = 100 | Ex. 6 = 3.8 | 60 | 1 | N | 2.1 | 2.1 |
| Coarse = 150 | Comp. Ex. 1 = 3.0 | 60 | 1 | N | 2.1 | 2.1 |
| Fine = 100 | Comp. Ex. 1 = 3.0 | 60 | 1 | N | 2.1 | 2.1 |

*$[NaOx]_{Initial} = [NaOx]_{LTP} + [NaOx]_{Spiked}$

Generally, oxalate precipitates as invisible needles, which could be due to either too many oxalate needles precipitated or too little CGM dosed. To facilitate oxalate forming visible balls, oxalate spiked at a reduced level of 0.5 g/l was tested. The results shown in TABLE 6 indicate that:

a. CGM type greatly impacts oxalate ball formation under test conditions. Larger oxalate balls were formed with the Example 6 CGM and smaller oxalate balls were observed for the Comparative Example 1 while no visible oxalate balls being formed with the control (blank) tests;

b. Example 6 can stabilize about ~0.3 g/l oxalate (relative to Comparative Example 1); and c. Seed type showed marginal impact on oxalate precipitation and oxalate ball formation.

Figure 1:
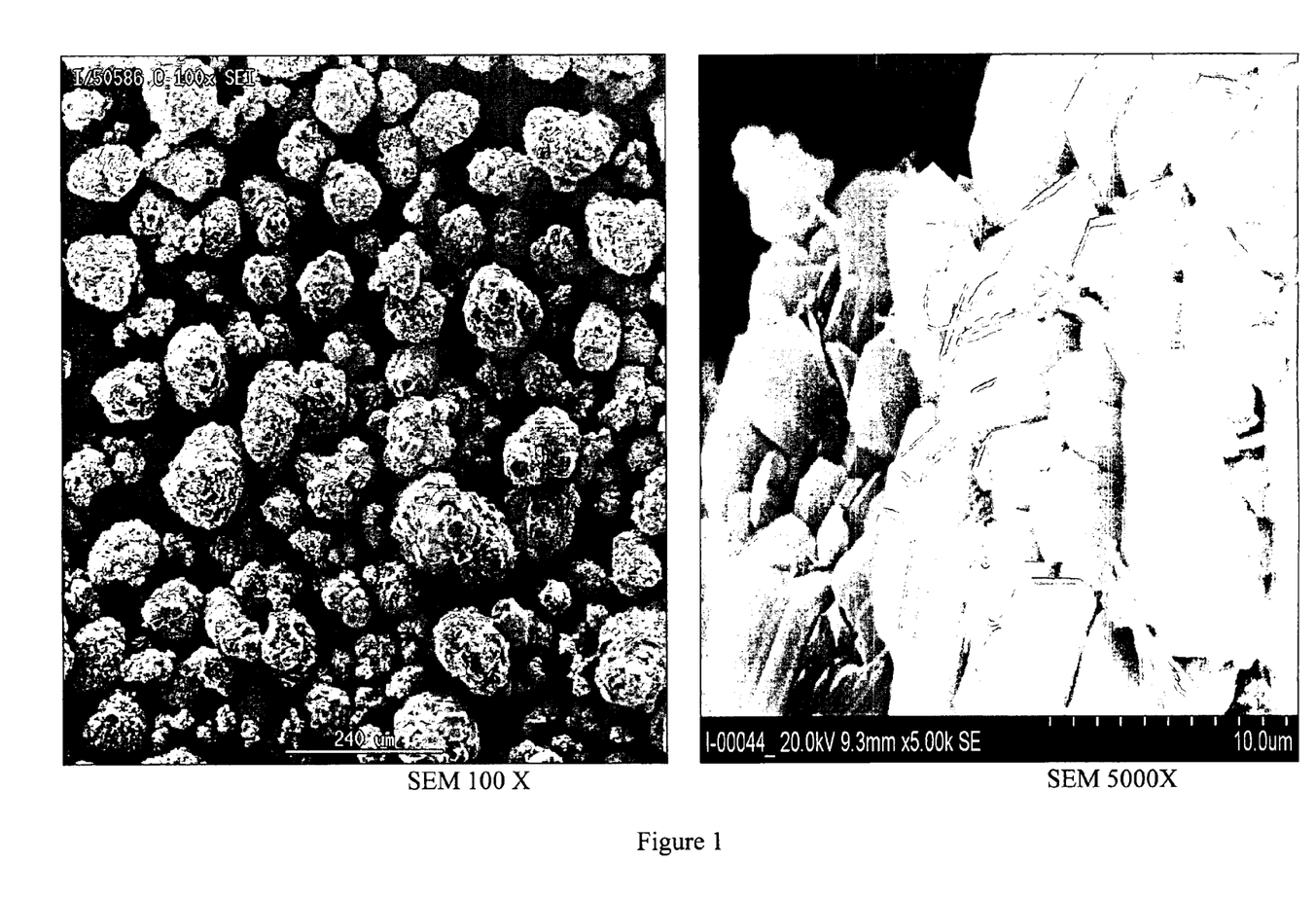
FIG. 1 is a pair of scanning electron microscope (SEM) micrographs taken at 100× and 5000×, respectively, of aluminum crystals from a blank test produced without a crystallization modifier.
Figure 2:
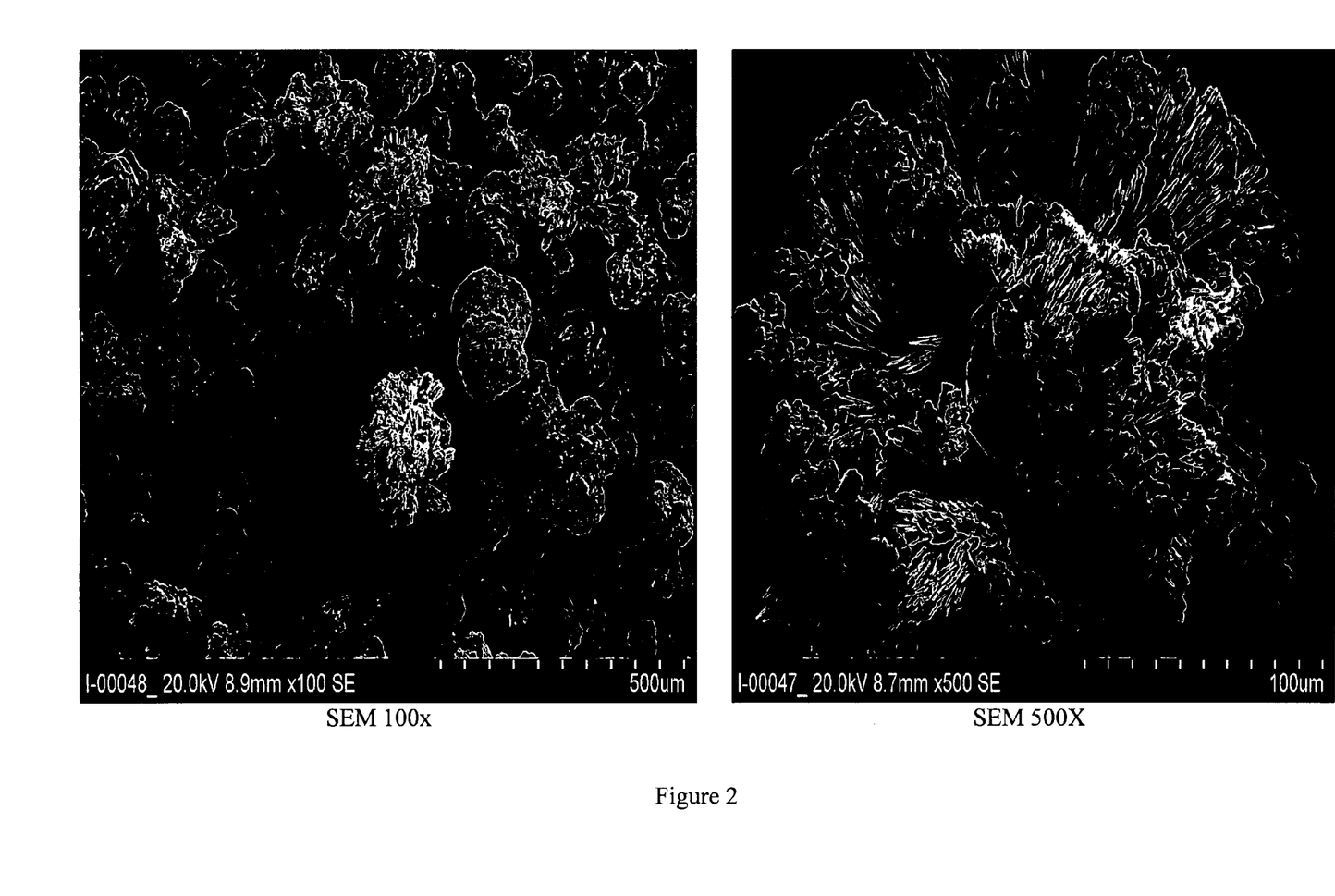
FIG. 2 is a pair of SEM micrographs taken at 100× and 500×, respectively, of aluminum crystals from a test using 12 mg/m² of a commercial modifier.
Figure 3:
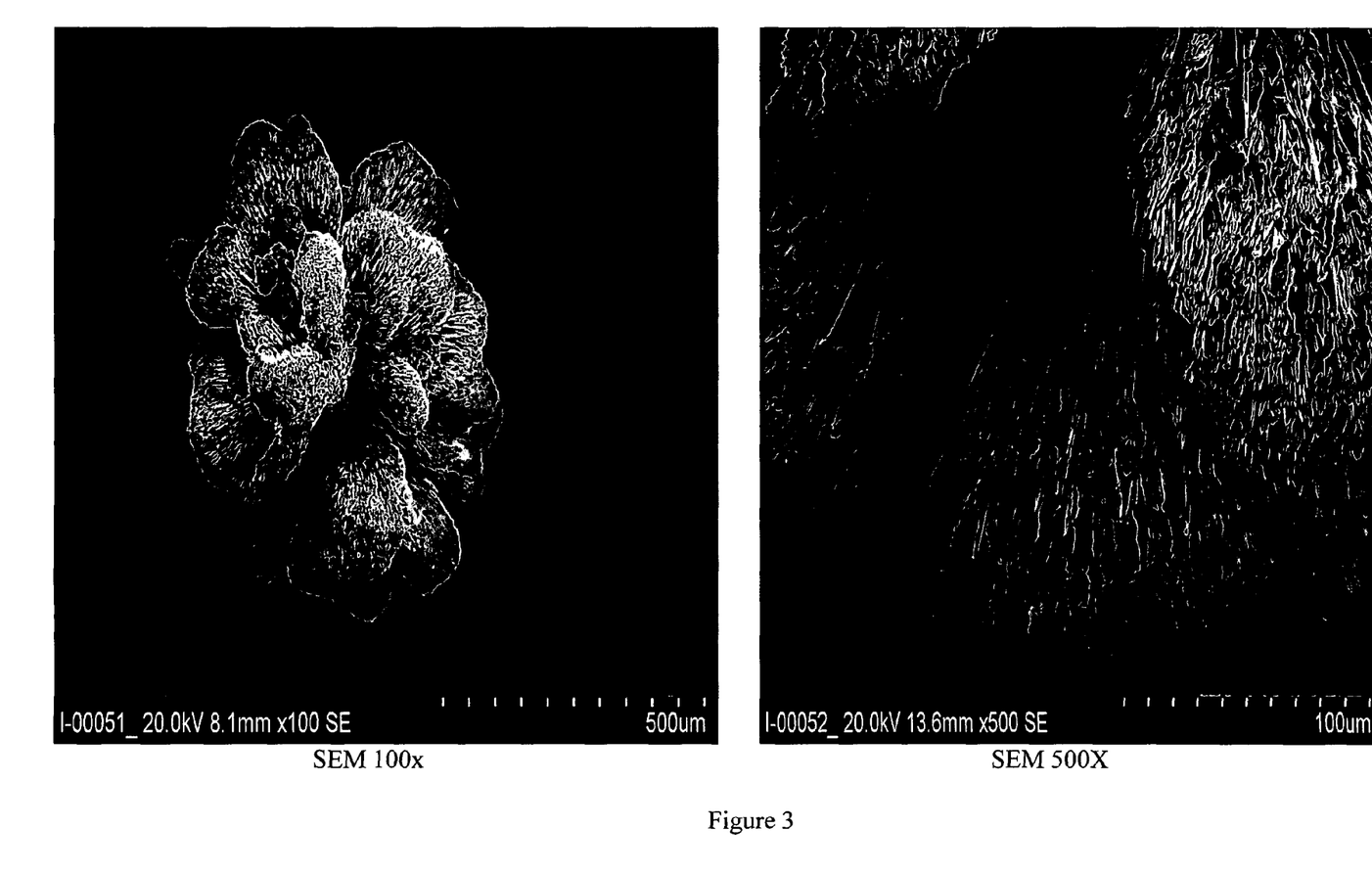
FIG. 3 is a pair of SEM micrographs taken at 100× and 500×, respectively, of aluminum crystals from a test using 12 mg/m² of a C8-10 fatty acid modifier of the present invention.

To further observe the morphology of the oxalate balls, the precipitates were sent for Scanning Electron Microscope (SEM) analysis. The SEM micrographs of the precipitates are shown in FIGS. 1-3. In the blank test (without CGM), shown in FIG. 1, oxalate needles incorporated into the trihydrate without distinct oxalate balls were observed with both fine and coarse seeds. With Comparative Example 1, referring to FIG. 2, oxalate balls (up to 200 μm) co-precipitated with trihydrate were formed. With Example 6, as shown in FIG. 3, clean oxalate balls up to 500 μm were observed. The SEM micrographs also visually show that the oxalate balls formed with Example 6 have less trihydrate trapped in the oxalate balls. This could result in lower alumina losses through the oxalate removal system.

Although the invention has been described in detail in the foregoing for the purpose of illustration, it is to be understood that such detail is solely for that purpose and that variations can be made therein by those skilled in the art without departing from the spirit and scope of the invention except as except as it may be limited by the claims.

What is claimed is:

1. A process for recovering aluminum hydroxide crystals from a pregnant Bayer process liquor comprising the steps of:
preparing a crystallization modifier comprising:

TABLE 6

Oxalate Precipitations. Liquor to Precipitation: A 153.6 g/L, C 220.2 g/L, S 266.9 g/L, A/C 0.698, NaOx 3.2 g/L.

| | Precipitation Conditions | | | Spent Liquor (SP) | | Δ[NaOx]* |
|---|---|---|---|---|---|---|
| | CGM | | [NaOx] | Oxalate balls | | (Initial-SP), |
| Seed, g/L | mg/m² | ppm | Spiked, g/L | Visible | [NaOx], g/L | g/L |
| C31 = 50 | Ex. 6 = 3.0 | 60 | 0.5 | Large balls | 2.3 | 1.4 |
| Coarse = 150 | Ex. 6 = 4.6 | 60 | 0.5 | Large balls | 2.4 | 1.3 |
| Fine = 100 | Ex. 6 = 3.8 | 60 | 0.5 | Large balls | 2.5 | 1.2 |
| C31 = 50 | Comp. Ex. 1 = 3.0 | 60 | 0.5 | Small balls | 2.1 | 1.6 |
| Coarse = 150 | Comp. Ex. 1 = 4.6 | 60 | 0.5 | Small balls | 2.0 | 1.7 |
| Fine = 100 | Comp. Ex. 1 = 3.8 | 60 | 0.5 | Small balls | 2.2 | 1.5 |
| Coarse = 150 | Blank | 0 | 0.5 | None | 2.2 | 1.5 |
| Fine = 100 | Blank | 0 | 0.5 | None | 2.1 | 1.6 |

*$[NaOx]_{Initial} = [NaOx]_{LTP} + [NaOx]_{Spiked}$ a $C_8$ to $C_{10}$ fatty acid, precursor, salt or blends thereof, the fatty acid carbon backbone being free of functional groups, an oil carrier, and water, emulsifying the crystallization modifier, and adding the emulsified crystallization modifier to the liquor;

wherein the crystallization modifier excludes polyalkoxylated non-ionic surfactant.

2. The process of claim 1, wherein the modifier further comprises an emulsifier.

3. The process of claim 2, wherein the modifier further comprises a pH-adjuster.

4. The process of claim 2, wherein the ratio of oil carrier to emulsifier is not greater than 2.

5. The process of claim 2, wherein the emulsifier is present in an amount within the range of greater than 0% to about 50% by weight.

6. The process of claim 1, wherein the water content of the modifier is in the range of greater than 0% to about 85% by weight.

7. The process of claim 1, wherein the water content of the modifier is in the range of from about 38% to about 68% by weight.

8. The process of claim 7, wherein the water content of the modifier is about 53% by weight.

9. The process of claim 3, wherein the pH-adjuster comprises an alkali.

10. The process of claim 3, wherein the alkali is selected from the group consisting of a hydroxide of an alkali metal and an amine.

11. The process of claim 2, wherein the emulsifier comprises a non-ionic surfactant.

12. The process of claim 11, wherein the non-ionic surfactant comprises an ethoxylated propoxylated C4-18 alcohol having a molecular weight of about 1000.

13. The process of claim 1, wherein the oil carrier content of the modifier is in the range of from about 60% to about 99% by weight.

14. A process for recovering aluminum hydroxide crystals from a pregnant Bayer process liquor by adding a crystallization modifier to the liquor, wherein the crystallization modifier comprises:

a surfactant fatty acid, precursor, salt or blends thereof, the fatty acid having an alkyl chain length of $C_8$ to $C_{10}$ carbon atoms free of functional groups, dissolved in an oil having a boiling point above about 200° F., and emulsified in water;

wherein the crystallization modifier excludes polyalkoxylated non-ionic surfactant.

15. A process for recovering aluminum hydroxide crystals from a pregnant Bayer process liquor by adding into the liquor an emulsified crystallization modifier comprising a $C_8$ to $C_{10}$ fatty acid additive, an oil carrier for dissolving the fatty acid, and water, wherein the fatty acid is free of functional groups;

wherein the crystallization modifier excludes polyalkoxylated non-ionic surfactant.

16. The process of claim 15, wherein the water content of the modifier is in the range of greater than 0% to about 85% by weight.

17. The process of claim 15, wherein the modifier further comprises an emulsifier.

18. The process of claim 17, wherein the emulsifier comprises a surfactant having an HLB less than 15.

19. The process of claim 18, wherein the emulsifier has an HLB in the range of from 8 to 14.

20. A process for recovering aluminum hydroxide crystals from a pregnant Bayer process liquor by adding an emulsified crystallization modifier to the liquor, wherein the emulsified crystallization modifier comprises:

(a) a surfactant fatty acid, precursor, salt or blends thereof, said fatty acid having an alkyl chain length of $C_8$ to $C_{10}$ carbon atoms, said carbon atoms free of functional groups;

(b) an oil having a boiling point above about 200° F. in which the fatty acid is dissolved;

(c) an emulsifier in an amount no greater than about 50% by weight;

(d) a pH-adjuster; and (e) water in an amount within the range of from 0% to about 85% by weight;

wherein the crystallization modifier excludes polyalkoxylated non-ionic surfactant.

21. The process of claim 20, wherein the fatty acid content is in the range of from about 1% to about 40%.

22. The process of claim 20, wherein the modifier is added in an amount effective to shift particle size distribution of aluminum hydroxide crystals such that the resulting crystals have a reduced formation of product fines.

23. The process of claim 20, wherein the modifier is added in an effective amount to provide an upward shift in particle size distribution of aluminum hydroxide.

24. An emulsified crystallization modifier for use in recovering aluminum hydroxide crystals from a pregnant Bayer process liquor, the modifier comprising:

(a) a surfactant fatty acid, precursor, salt or blends thereof, said fatty acid having an alkyl chain length of $C_8$ to $C_{10}$ carbon atoms, said carbon atoms free of functional groups;

(b) water in an amount within a range of from greater than 0% to about 85% by weight;

(c) an oil in which the fatty acid is dissolved; and (d) an emulsifier in an amount no greater than 50% by weight;

wherein the crystallization modifier excludes polyalkoxylated non-ionic surfactant.

25. A Bayer process for producing aluminum hydroxide crystals having a reduced formation of product fines concurrent with an upward shift in particle size distribution of aluminum hydroxide, the process comprising addition of the modifier of claim 24.

26. A Bayer process for producing aluminum hydroxide crystals having a reduced formation of product fines concurrent with an upward shift in particle size distribution of aluminum hydroxide and an upward shift in oxalate ball size, the process comprising the addition of the modifier of claim 24.

27. A process for recovering aluminum hydroxide crystals from a pregnant Bayer process liquor comprising the steps of:

preparing a crystallization modifier comprising:

a $C_8$ to $C_{10}$ fatty acid, precursor, salt or blends thereof, the fatty acid carbon backbone being free of functional groups, an oil carrier, and water used to emulsify the modifier, adding the crystallization modifier to the liquor in an amount sufficient to effectively and simultaneously precipitate oxalate balls from the liquor, and removing the oxalate balls, wherein the oxalate balls are substantially free of aluminum hydroxide crystals;

wherein the crystallization modifier excludes polyalkoxylated non-ionic surfactant.

28. The process of claim 27, wherein oxalate balls precipitate to a size in the range of from about 200 to about 700 μm.

29. The process of claim 27, wherein the oxalate balls precipitate to a size greater than about 300 μm.

30. The process of claim 27, wherein the modifier comprises an oil carrier in an amount within a range of from about 60% to about 99% by weight.

31. The process of claim 27, wherein the modifier comprises an emulsifier and the ratio of oil carrier to emulsifier is not greater than 2.

32. The process of claim 31, wherein the modifier further comprises a pH-adjuster.

33. The process of claim 31, wherein the emulsifier is present in an amount within a range of greater than 0% to about 50% by weight.

34. The process of claim 27, wherein the water content of the modifier is in the range of greater than 0% to about 85% by weight.

35. The process of claim 27, wherein the water content of the modifier is in the range of from about 38% to about 68% by weight.

36. The process of claim 27, wherein the water content of the modifier is about 53% by weight.

37. The process of claim 32, wherein the pH-adjuster comprises an alkali.

38. The process of claim 37, wherein the alkali is selected from a group consisting of a hydroxide of an alkali metal and an amine.

39. The process of claim 38, wherein the alkali is potassium hydroxide.

40. The process of claim 27, wherein the emulsifier comprises a non-ionic surfactant.

41. The process of claim 40, wherein the emulsifier comprises an ethoxylated propoxylated C4-C18 alcohol.

42. A process for recovering aluminum hydroxide crystals from a pregnant Bayer process liquor comprising the steps of:
   preparing a crystallization modifier comprising:
   a $C_8$ to $C_{10}$ fatty acid, precursor, salt or blends thereof, the fatty acid carbon backbone being free of functional groups,
   an oil carrier for dissolving the fatty acid, and
   water for emulsifying with the fatty acid,
   adding the crystallization modifier to the liquor in an amount sufficient to precipitate oxalate balls having size in the range of at least 200 μm from the liquor, and
   removing the oxalate balls;
   wherein the crystallization modifier excludes polyalkoxylated non-ionic surfactant.

43. The process of claim 42, wherein the oxalate balls are substantially free of aluminum hydroxide crystals.

* * * * *